June 17, 1958 — M. E. BOURNS — 2,839,701
VACUUM TUBE PICK-UP
Filed Aug. 3, 1953 — 2 Sheets-Sheet 1

MARLAN E. BOURNS,
INVENTOR.

BY *Lyon & Lyon*
ATTORNEYS

June 17, 1958 M. E. BOURNS 2,839,701
VACUUM TUBE PICK-UP

Filed Aug. 3, 1953 2 Sheets-Sheet 2

MARLAN E. BOURNS,
INVENTOR.

BY Lyon Lyon
ATTORNEYS

United States Patent Office 2,839,701
Patented June 17, 1958

2,839,701

VACUUM TUBE PICK-UP

Marlan E. Bourns, Riverside, Calif.

Application August 3, 1953, Serial No. 372,072

2 Claims. (Cl. 313—146)

This invention relates to vacuum tubes and more particularly to vacuum tubes which have characteristics variable by external means.

In telemetering and particularly in the manufacture, development and testing of guided missiles and aircraft, it is frequently necessary to measure and to utilize the measurements in the actuation of other devices of pressure, temperatures, acceleration, vibration, position and other physical phenomena. This information is used either through telemetering channels or other media to determine the performance of the missile or as used in servo systems to control or guide the missile or aircraft. This result has been accomplished by the use of pick-ups or transducers of the potentiometer type, strain gauge type, variable inductance type and the like which provide a varying electrical output in response to a change in physical phenomena. Generally, it is necessary to amplify or otherwise alter the output of the pick-up by means of vacuum tubes, amplifiers and related electronic equipment. Thus, generally, both a pick-up and a vacuum tube are necessary to complete the system.

It is a primary object of this invention to provide a vacuum tube which itself serves as a pick-up thus eliminating one-half of the required equipment.

It is a further object of this invention to provide such a vacuum tube which will measure various physical phenomena such as acceleration, vibration, pressure, position or temperature.

It is a further object of this invention to provide vacuum tubes which have gains or other electrical characteristics which are variable in response to external physical phenomena and yet which are stable under the environment such as is encountered in missile and aircraft applications.

It is a further object of this invention to provide such a vacuum tube which is responsive to one only of such external physical phenomena.

It is a further object of this invention to provide a vacuum tube pick-up which is completely hermetically sealed and impervious to moisture, dust, corrosion and other factors.

These and other objects, features and advantages of the present invention will be apparent from the annexed specification in which.

Figure 1:
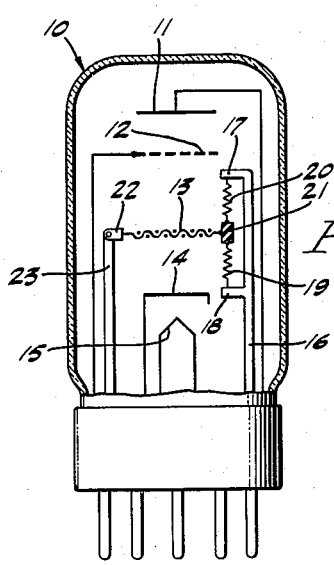
Figure 1 is a diagrammatic representation of a tetrode adapted to give a varying response to acceleration or vibration.

Referring now more particularly to the drawings, in Figure 1 there is illustrated a tetrode including a vacuum tube 10 in which there is mounted the conventional plate 11, screen 12, grid 13, cathode 14 and heater 15. A post 16 is provided having a pair of inwardly extending arms 17 and 18, between which there is interposed a pair of coil springs 19 and 20 having their inner ends attached to an insulating block or weight 21. The grid 13 is attached to the weight 21 at one end and to a link 22 pivotally mounted on an arm 23 at the other end.

It will be appreciated that when this device is subjected to acceleration or vibration, the weight 21 will move against the bias of one or other of the springs 19 or 20 thus pivoting the grid 13 about its pivotal connection with the post 23. The movement of the grid 13 thus provided will, of course, cause a change in the electrical output of the vacuum tube, which change can be imposed in an electrical system as desired to either record the acceleration or vibration or to cause the same to be used in servo mechanisms and the like.

Figure 2:
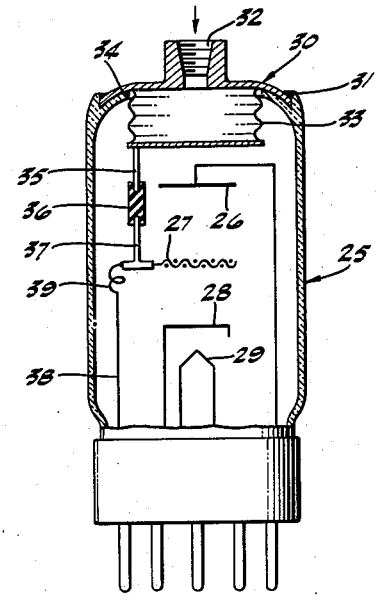
Figure 2 is a triode adapted to measure external pressure.

Referring now more particularly to Figure 2, there is shown a triode including a vacuum tube 25 including a plate 26, grid 27, cathode 28 and heater 29. In this case, the tube is provided with a fitting 30 sealed in an opening therein as at 31 and having a threaded connection 32 for a tube or the like. A bellows 33 is sealed in the opening 34 in the end of the tube and carries a post 35 mounting an insulating block 36 and a connecting member 37 which is directly attached to the grid 27. The filament 38 connected to the member 37 is made flexible by a coil 39. It will be appreciated that with the device thus described, pressure within the bellows 33 will cause expansion of the same with the consequent movement of the position of the grid 27 thus causing a change in the characteristics of the electrical output of the tube.

Figure 3:
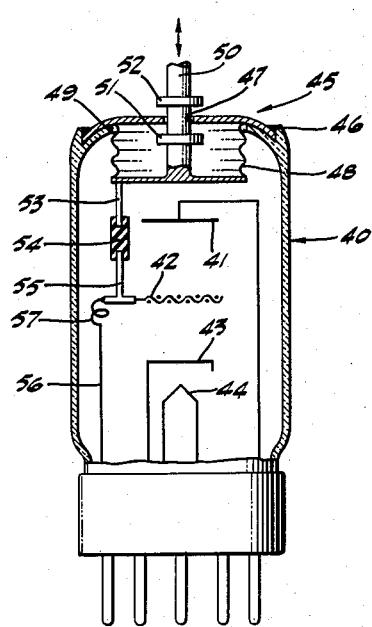
Figure 3 is a triode adapted to measure linear positions.

Referring now more particularly to Figure 3, there is shown a vacuum tube 40 having a plate 41, grid 42, cathode 43 and heater 44. The tube 40 is open at one end and provided with a closure 45 sealed thereto as at 46. The closure 45 is provided with an opening 47 and a bellows 48 is sealed in the opening 49. The bellows has a shaft 50 attached to the end thereof and passing through the opening 47 with a pair of collars 51 and 52 mounted thereon. An arm 53 is attached to the bellows and carries an insulating block 54 which is attached to a connecting member 55 connected to the grid 42. As in the device shown in Figure 2, the filament 56 is provided with a loop 57 to permit movement thereof.

It will be appreciated that with the device shown in Figure 3 movement of the shaft 50 will cause expansion or retraction of the bellows 48 with the consequent movement of the grid 42 and change in the characteristics of the output of the vacuum tube.

Figure 4:
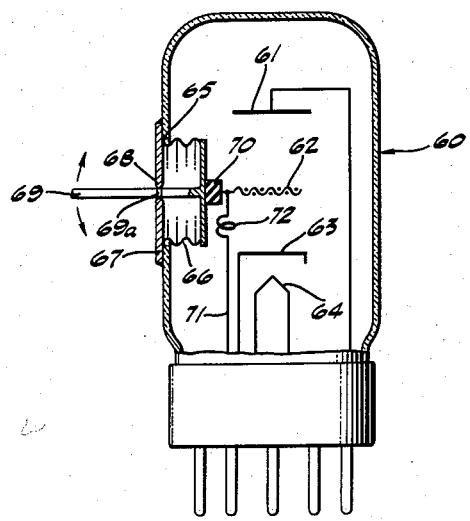
Figure 4 illustrates a triode adapted to measure angle motions.

Referring now more particularly to Figure 4, there is shown a vacuum tube 60 including a plate 61, grid 62, cathode 63 and heater 64. In this case, an opening 65 is made in the side of the tube sealed by a bellows 66. A plate 67 is provided having an opening 68 through which passes a shaft 69 having a groove 69a therein adapted to fit in the opening 68. The shaft 69 has its inner end attached to the end of the bellows 66 and is thus mounted for angular movement in the opening 68. The grid 62 is attached to an extension 70 on the bellows, and the filament 71 is again provided with a loop 72. It will be appreciated that with the device of the type shown in Figure 4, angular movement of the shaft 69 will cause a pivoting thereof with consequent movement in an arcuate path of the grid 62, thus again altering the characteristics of the electrical output of the vacuum tube.

Figure 5:
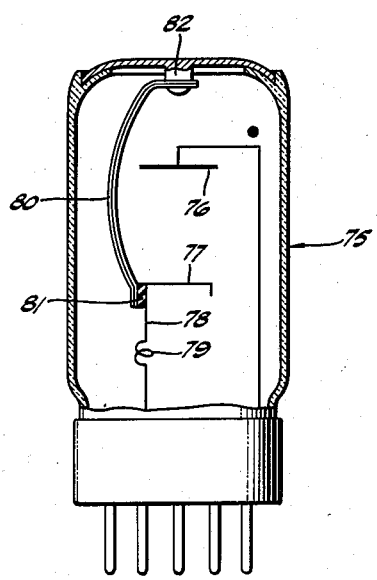
Figure 5 illustrates a diode adapted to measure temperatures.

Referring now more particularly to Figure 5, there is shown a vacuum tube 75 of the gas-filled type including a plate 76 and a cathode 77. The cathode 77 is attached to a filament 78 having a loop 79 therein. A bi-metal strip 80 is attached to an insulating block 81 attached to the cathode 77 and to a post 82 mounted in the end of the tube.

It will be appreciated that the device of this type, the bi-metal loop responds to an increase or decrease of temperature within the tube thus moving the cathode 77 and changing the characteristics of the electrical output of the tube.

Figure 6:
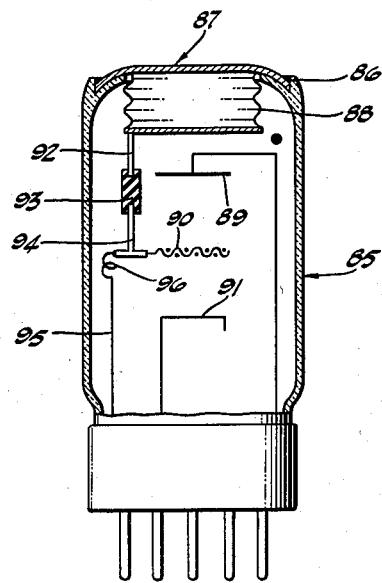
Figure 6 illustrates a triode adapted to measure internal temperature.

Referring now more particularly to Figure 6, there is shown a vacuum tube 85 having an opening 86 in which is sealed a plate 87. The plate 87 carries a bellows 88. The tube 85 is provided with a plate 89, grid 90 and cathode 91. The bellows 88 mounts a post 92 carrying an insulating member 93 and a connecting element 94 which is attached to the grid 90. A filament 95 of the grid 90 is again provided with a loop 96.

The space between the plate 87 and the end of the bellows 88 is designed to be initially filled with a temperature responsive medium such as a gas or liquid such as mercury which is responsive in volume and pressure to changes in temperature. It will thus be apparent that a change of temperature within the bellows 88 will cause a movement of the grid 90 with a consequent variation in the characteristics of the electrical output of the vacuum tube.

Figure 7:
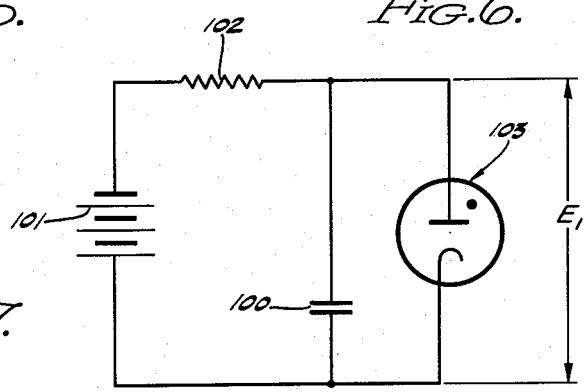
Figure 7 illustrates diagrammatically one of the many possible circuits in which pick-ups of the type illustrated can be used.

Referring now to Figure 7, there is shown a circuit including a capacitor 100 and E. M. F. 101, resistor 102 and a gas-filled tube pick-up 103 which may be any of the device illustrated in Figures 1 through 6. This is a relaxation oscillator type circuit. The frequency of the output will vary in accordance with the position of the grid which as above explained will be controlled by the physical phenomenon being measured.

Figure 8:
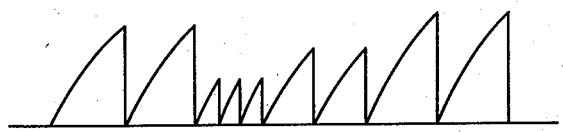
Figure 8 is a wave diagram of a typical response of a pick-up of the type described.

Figure 8 illustrates a typical output of such circuit.

In Figures 1, 2, 3, 4 and 6, there has been illustrated a vacuum tube in which the physical phenomenon being measured is applied in one means or another to cause a movement of the grid. In Figure 5, there has been illustrated a device in which the physical phenomenon being measured is applied to a movement of the cathode. It will be appreciated that it is well within the scope of this invention to apply the physical phenomenon for a movement of any of the elements of a vacuum tube to thus alter the characteristics of the electrical output.

When the term "vacuum tube" is used herein, it comprehends both hard and soft tubes and includes gas-filled tubes.

While there has been described what is at present considered the preferred embodiment of the present invention, it will be appreciated by those skilled in the art that various changes and modifications can be made therein without departing from the essence of the invention and it is intended to cover herein all such changes and modifications as come within the true spirit and scope of the appended claims.

I claim:

1. A mechanically modulated vacuum tube comprising a rigid envelope, a cathode and a plate mounted within said envelope in spaced relation, a grid interposed between said cathode and plate and supported for movement with respect thereto, mass means attached to said grid, and means yieldingly suspending said mass means between said cathode and said plate, said mass means being movable responsive to acceleration to vary the electrical output of said tube as a function of the acceleration forces.

2. An acceleration-responsive vacuum tube comprising a rigid envelope, a cathode and a plate mounted within said envelope in spaced relation, a grid interposed between said cathode and plate, said grid being supported at one edge for movement with respect to said plate and cathode, a mass member attached to the other edge of said grid, and spring means yieldingly holding said mass member and said other edge of said grid in a position of rest between said cathode and said plate, said mass member being movable from said position of rest responsive to acceleration to vary the electrical output of said tube as a function of the acceleration forces.

References Cited in the file of this patent

UNITED STATES PATENTS

| | | |
|---|---|---|
| 250,193 | Bohm | Nov. 29, 1881 |
| 1,309,753 | De Forest | July 15, 1919 |
| 1,983,838 | Bowles | Dec. 11, 1934 |
| 2,389,935 | Rothstein | Nov. 27, 1945 |
| 2,579,136 | Anderson | Dec. 18, 1951 |
| 2,602,906 | Johnson | July 8, 1952 |